United States Patent
Bogdanowicz et al.

(10) Patent No.: US 7,583,355 B2
(45) Date of Patent: *Sep. 1, 2009

(54) METHOD AND SYSTEM FOR PRESERVING THE CREATIVE INTENT WITHIN A MOTION PICTURE PRODUCTION CHAIN

(75) Inventors: Mitchell J. Bogdanowicz, Camarillo, CA (US); Nhon N. Chu, Paris (FR); Martin E. Oehlbeck, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 700 days.

This patent is subject to a terminal disclaimer.

(21) Appl. No.: 11/143,168

(22) Filed: Jun. 2, 2005

(65) Prior Publication Data

US 2006/0001832 A1    Jan. 5, 2006

Related U.S. Application Data

(63) Continuation of application No. 10/740,324, filed on Dec. 18, 2003, now Pat. No. 6,972,828.

(51) Int. Cl.
*G03B 19/18* (2006.01)
(52) U.S. Cl. ......................................... 352/38
(58) Field of Classification Search .................. 348/181, 348/222.1, 223.1, 576, 722; 352/38
See application file for complete search history.

(56) References Cited

U.S. PATENT DOCUMENTS

| | | | |
|---|---|---|---|
| 5,319,465 A | 6/1994 | Squyres | 358/310 |
| 5,912,994 A | 6/1999 | Norton et al. | 382/283 |
| 6,122,006 A | 9/2000 | Bogdanowicz et al. | 348/222 |
| 6,972,828 B2 * | 12/2005 | Bogdanowicz et al. | 352/38 |
| 2002/0163676 A1 * | 11/2002 | Jones et al. | 358/505 |
| 2003/0071897 A1 | 4/2003 | Brett | 348/97 |

FOREIGN PATENT DOCUMENTS

WO    WO 03/096682 A1    11/2003

* cited by examiner

*Primary Examiner*—Rodney E Fuller
(74) *Attorney, Agent, or Firm*—Stephen H. Shaw

(57) ABSTRACT

A method for communicating and preserving creative intent within a motion picture production chain, including a production stage, and at least one of a subsequent laboratory or post production stage, including capturing an original image of a scene during the production stage; generating a look representative of a creative intent, wherein the look is a digital representation of a creative alteration of the captured original scene image; and applying the look to the captured original scene image and confirming approval of the look during the production stage. The digital representation of the look is stored as a recipe for generating the creative alteration, and communicated from the production stage to at least one of the subsequent laboratory and post-production stages for applying the look to the captured motion picture footage during subsequent laboratory and post-production stages.

8 Claims, 10 Drawing Sheets

| FIG. 6A | FIG. 6B |

METHOD AND SYSTEM FOR PRESERVING THE CREATIVE INTENT WITHIN A MOTION PICTURE PRODUCTION CHAIN

CROSS-REFERENCE TO RELATED APPLICATION(S)

This is a continuation of U.S. application Ser. No. 10/740,324, filed 18 Dec. 2003 now U.S. Pat. No. 6,972,828 by Mitchell J. Bogdanowicz et al., and entitled "A Method and System for Communicating and Preserving the Creative Intent Within a Motion Picture Production Chain", wherein this prior Application is incorporated by reference herein.

FIELD OF THE INVENTION

The invention relates generally to the field of motion picture production, and in particular to effectively providing a communication tool for usage throughout the imaging chain that relates to transferring creative intent. More specifically, the invention relates to a creative intent recipe for maintaining a cinematographer's look and feel for a motion picture.

BACKGROUND OF THE INVENTION

A motion picture production, either a commercial, television show or a theatrical movie starts with a creative intent by a cinematographer (and/or director and/or other people involved in the creative intent) for an overall "look" for the project and its incorporation throughout each scene.

This "look" can be the creation of a single individual, such as the cinematographer or it can be a collaborative creation of a few or several people. If there is more than one person, the task of communicating the creative intent to everyone becomes a problem. Most often, the best way to communicate the creative intent is by creating an image for sharing and discussing. This enables actual viewing of the image without relying solely on ambiguous words to describe the image. U.S. Pat. No. 6,122,006 issued to Bogdanowicz et al. on Sep. 19, 2000 discloses the creation of a "look" and creation of a printed image to communicate the creative intent.

However, the task of maintaining the "look" does not stop with the cinematographer. In a modern motion picture the film element is exposed, developed by a laboratory, and sometimes printed onto a motion picture print stock for projection. In the laboratory there are usually many choices in processing and various techniques to alter the photographic image. A communication link must be established between the cinematographer and the laboratory to continue the evolution of the creative intent of the image.

Currently, most motion pictures have special effects added in at a post-production facility. These special effects can be quite elaborate and intricate However, more and more motion picture productions are scanning in an entire film project to a digital intermediate (also known as a digital master), which can be altered in a digital-to-digital suite where global, and local color and tone scale changes are introduced. If the originators/creators of the "look" are not present in the post-production house, the "look" may be compromised by other individuals taste or ideas. Further, if an overall "look" is to be applied to the project on a scene-by-scene basis, a colorist (i.e., the person running the digital equipment) needs to try to apply the look consistently across the project.

PROBLEM TO BE SOLVED BY THE INVENTION

Communication of the "look" throughout the motion picture production chain is advantageous for cinematographic consistency. The cinematographer is able to assume that the "look" will be correct and consistent from scene-to-scene. And yet, in post-production there are numerous degrees of freedom to change the image. A cinematographer cannot anticipate or influence the look that may be applied in a laboratory or postproduction facility. Additionally, in the postproduction facility, the application of the "look" can be a laborious process on a scene-by-scene basis. Furthermore, specific digital manipulation controls may not be robust throughout the entire dynamic range and may introduce artifacts or be unattainable with their instrumentation.

Also, an image can be altered by a 3D LUT (3-dimensional look-up table) to provide a "look", but the normal process for producing a 3D LUT is to empirically measure a small set of image patches and use the resulting data to interpolate a 3D LUT. This method is inherently error prone and its effectiveness is limited to the chosen measured data. In the laboratory, alternative processes can introduce a time consuming and costly testing phase before principle camera work starts. Usually the "look" that these alternative processes impart on the image is revealed only after physical testing.

What is needed is a method and system for communicating the creative intent of the "look" to directors, producers, wardrobe, writers, laboratory personnel, colorists, clients and executives associated with the motion picture production.

SUMMARY OF THE INVENTION

The present invention is directed to overcoming one or more of the problems set forth above. Briefly summarized, one aspect of the present invention provides a method for communicating and preserving creative intent within a motion picture production chain, including a production stage, and at least one of a subsequent laboratory or post production stage, including capturing an original image or sequence of images of a scene during the production stage; generating a look representative of a creative intent, wherein the look is a digital representation of a creative alteration of the captured original scene image; and applying the look to the captured original scene image and confirming approval of the look during the production stage. The digital representation of the look is stored as a recipe for generating the creative alteration, and communicated from the production stage to at least one of the subsequent laboratory and postproduction stages for applying the look to the captured motion picture footage during subsequent laboratory and postproduction stages.

ADVANTAGEOUS EFFECT OF THE INVENTION

The present invention generates an image and produces a 3D LUT to apply a creative "look" to an image or stream of images (i.e., a scene). The present invention allows a cinematographer to capture (or input) an image either with a digital camera, scanned film or CGI (Computer Generated Image) and further alter the image by choosing alternative film stocks, processing, filters, color timing, telecine controls and other changes to the image. The representation of the changes can be saved and distributed as a "recipe" which can be sent to remote sites and loaded into the system to display the "look" the originators intended at an office (i.e., director, producer, etc.), laboratory or post production house. The digital display devices are also dually calibrated, first to a standard position (with regards to the brightness, black level, tone scale and white color balance), next to emulate a photographic motion picture print material projected in a darkened surround. This display device calibration ensures that people viewing the images remotely are seeing the same image with the "look" incorporated therein. The recipe can be global to the production or on a scene-to-scene basis.

Furthermore, the present invention enables a post-production person to generate, from the recipe, an entity, such as a three dimensional lookup table (3D LUT), which can be applied to a digitally scanned product, either in software or hardware. This 3D LUT will embody the "look". The second part of the display calibration is a unique 3D LUT that emulates a particular print stock on a particular display device, such as a HD Monitor or a digital projector. The present invention uses this unique 3D LUT for the device to display the image, which includes the characteristics of the device, tone scale, color primaries or dye set (if the display device is a film print). For immediate display the recipe-created look 3D LUT ("look 3D LUT") is combined with the device-dependent 3D LUT ("device 3D LUT") to create a new 3D LUT ("display 3D LUT"), which will display the "look" on a specific device without altering the original data. The original data is maintained and transformations are applied in a forward manner, thus ensuring that there is no loss to the original data.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

Figure 1:
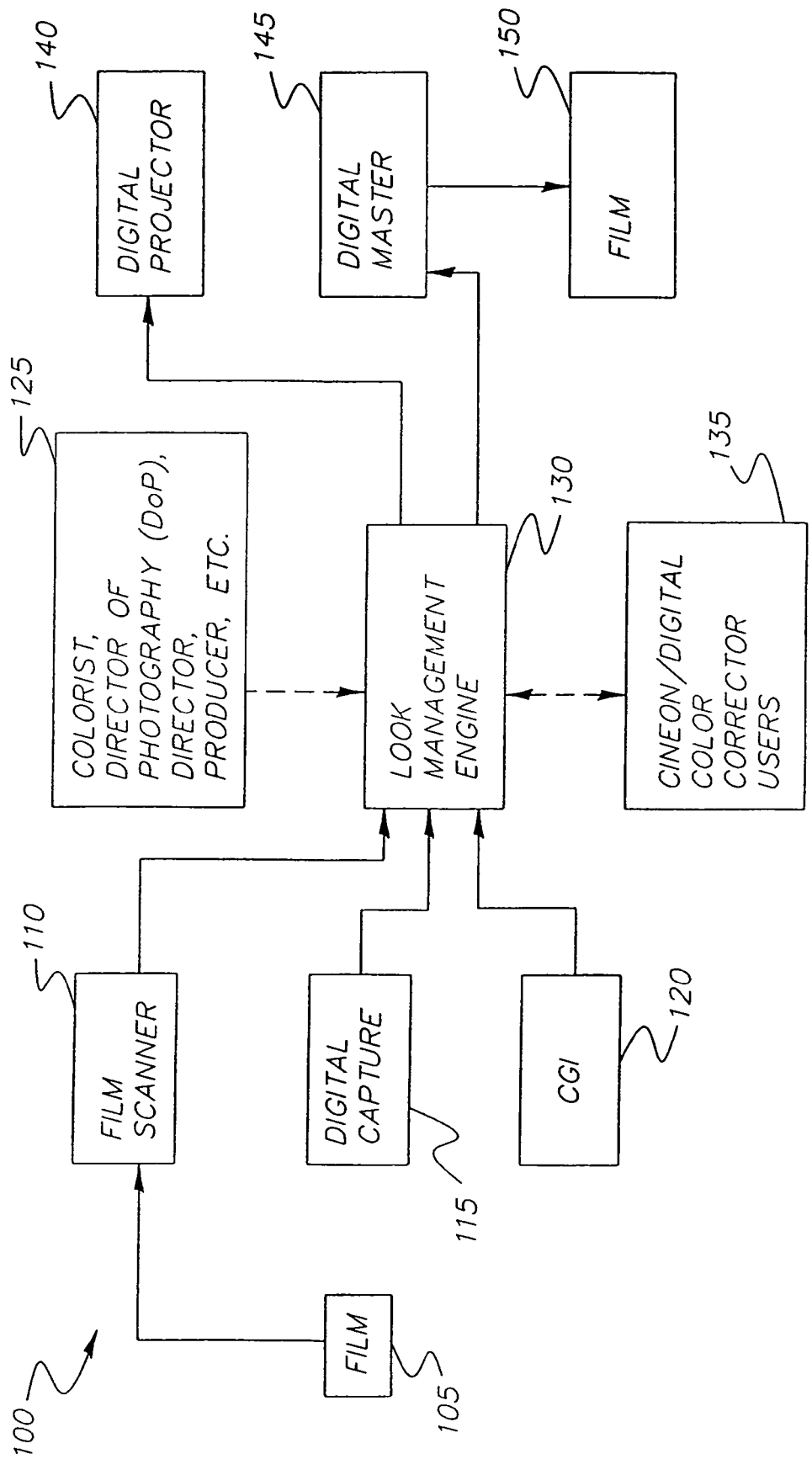
FIG. 1 is a block diagram showing a look management system, including input sources, look management engine, and output sources.

In the following description, at least one embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program may be stored in a computer readable storage medium, which may comprise, for example, magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The present invention can be performed on any well-known computer system, such as a personal computer.

The present invention can generate an image and produce a 3D LUT to apply a creative "look" to an image or stream of images (i.e., a scene). The present invention allows a cinematographer to capture (or input) an image, either with a digital camera, scanned film or a computer generated image (CGI); and alter the image by choosing alternative film stocks, processing, filters, color timing, telecine controls or other image modifying processes. A representation of the changes can be saved and distributed as a "recipe" which can be sent to remote sites and loaded into a look management system to display the "look" the originators/creators (e.g., a director, a producer, etc.) intended at an office, laboratory or post-production house. To maintain the look, display devices are dually calibrated. A first calibration calibrates the display device to a standard position (with regards to brightness, black levels, tone scale and white color balance). A second calibration enables the look management system to emulate a photographic motion picture print material, as it would be projected in darkened surroundings or a dim surround if the final project is intended to be delivered for standard or high definition television. This display device calibration ensures that viewers remotely viewing the images are "seeing" the same image. The recipe, itself, can be global to the production or on a scene-by-scene basis.

Moreover, the look management system at the post-production house can generate from the recipe an entity such as a three-dimensional lookup table (3D LUT), which can be applied either in software or hardware to the motion picture project. This 3D LUT will embody the "look", and is herein referred to as "look 3D LUT". The second part of the display calibration is a second 3D LUT that uniquely emulates a particular print stock on a particular display device, such as a high definition monitor or a digital projector. The present invention uses this unique second 3D LUT for the device, which includes the characteristics of the device, tone scale, color primaries or dye set (if the display device is a film print), to display the image. For immediate display, the recipe created look 3D LUT, ("look 3D LUT"), is combined with the device dependent 3D LUT, referred to as ("device 3D LUT") to create a third and different 3D LUT, referred to as ("display 3D LUT"), which will display the "look" on a specific device without altering the original data. The original data should be maintained and transformations be applied in a forward manner. This ensures that there is no loss to the original data.

Herein the following definitions apply:

A "Look" is the creative alteration of the captured original scene image (reality) to invoke an emotion or to emphasize an idea in the story telling process.

A "Recipe" is a computer file that includes all of the user's input choices (and some default values) that were used to create the "look" for the scene. It can be sent to another computer with similar software, which can then apply the recipe to an image and (on a colorimetrically calibrated output device) see the same image as the creative author. In the post-production facility it can be used to produce a 3D lookup table to process the whole or sequence of scenes.

For example, the recipe includes information that setup the look, such as emulation parameters, configurations, human readable information that facilitates text searching, and information expressed in a cinematographer's language (e.g., film stages chain, timing, processes, and principle photography). Other information may be included in the recipe such as binary information that enables tracking a user's information (e.g., author, user's computer information, license information, and user's system configuration). A user's monitor calibration information and a user's license level for recipe sharing, such as original author, and last author, may be included. The present invention may incorporate read only recipe management that necessitate inputting a password; recipe integrity checks that verify whether the recipe has been modified outside of the application; and/or recipe authenticity checks that verify whether the original intent has been modified by other users.

Referring to FIG. 1, a Look Management System (LMS) 100 communicates the creative intent of the originator/creator to persons in the motion picture production chain that need to understand and react to the "look" of the project. In one exemplary embodiment, an industry standard scanner 110 scans a film element 105. The original scene could also be captured by a digital camera device (115) or it can be constructed of computer-generated images (CGI) (120). The image is introduced into a Look Management Engine (LME) (130) where the creative changes can be made. LME 130 is driven by one of several originators/creators 125; for example, a Director of Photography (DoP), a producer, a director, a colorist, etc. The output images can be displayed on a display device 140, such as a digital Projector or CRT; alternatively it can be stored as a digital master 145, which can be recorded by a film recorder (not shown) and printed as film 150 for projection display.

Figure 2:
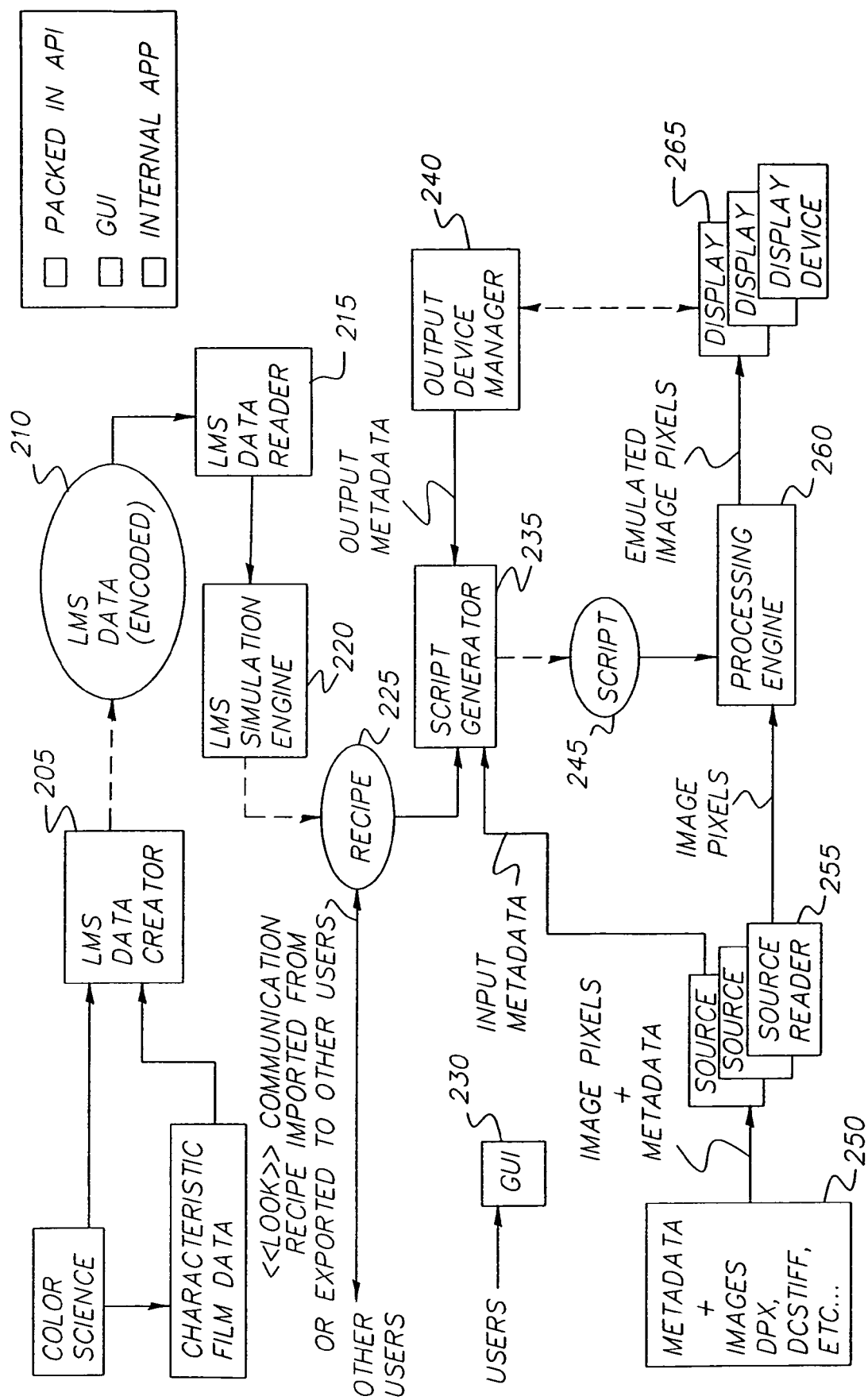
FIG. 2 is a block diagram of one embodiment of a software system to implement a look management system which generates a script from user input and executes that script by a processing engine.

One illustrative software overview for LMS 100 is shown in FIG. 2. Users of the software interact with a graphical user interface (GUI) (230) for all their choices. Alternatively, other possibly remote users can communicate by sending a "recipe" 225, which is a file that contains the instructions to the software about the changes to an image. Recipe 225 is used as an input to a script generator 235, which interprets the recipe 225 and generates a script (245) that is a logical sequence of transformation that will result in the perturbation of the image into the desired "look". A processing engine (260) takes the script as input and processes image pixels (255), which are input (250) into software 250 that includes a plurality of image source types and metadata (e.g., DPX files, digital images). Each image source type has an associated source reader (255) to properly input the image. The Processing Engine (260) produces a math model in color science language and shown in FIG. 4.

Figure 4:
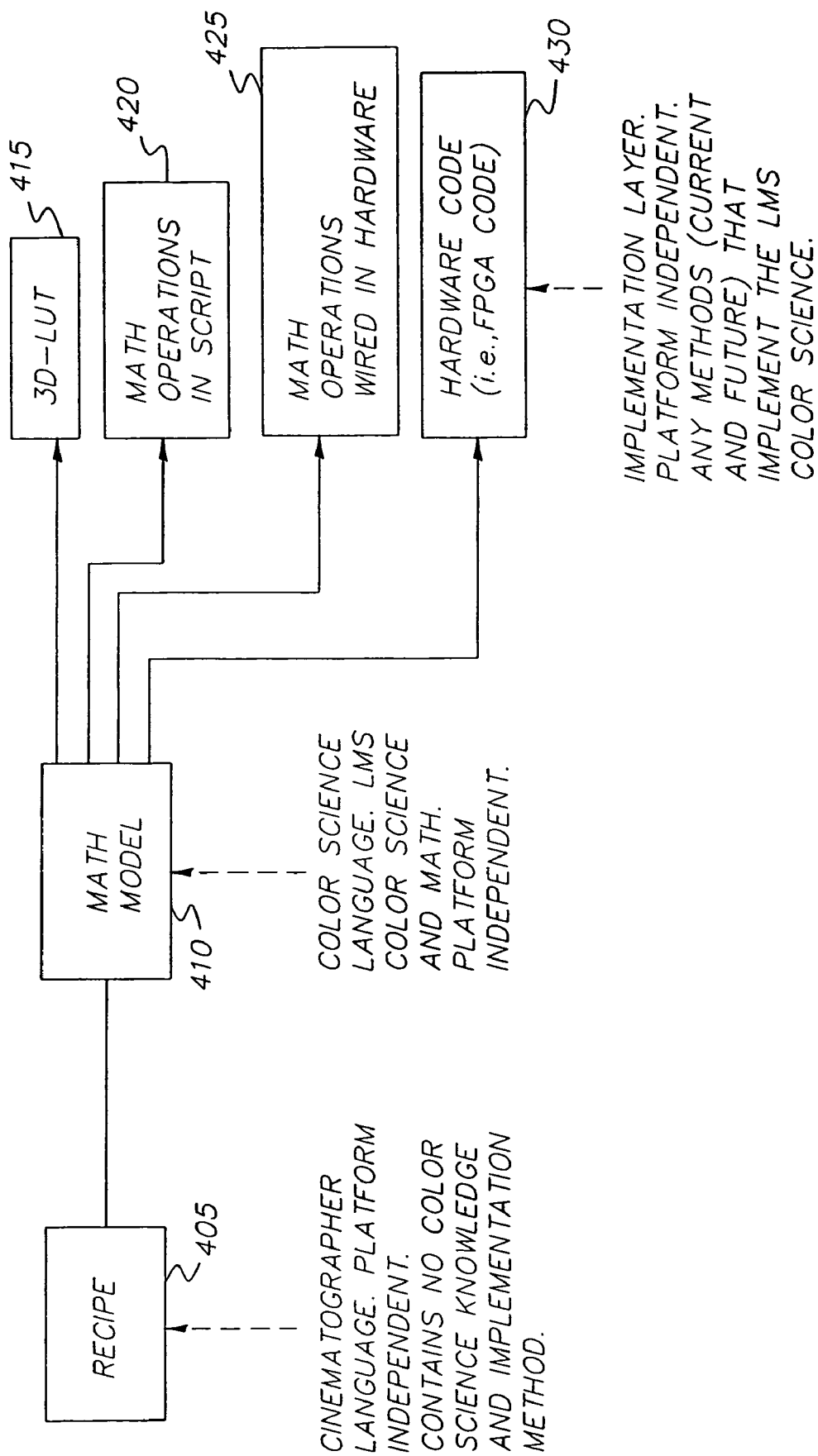
FIG. 4 is a flow diagram of the mathematical implementation of the recipe in this look management system.

Referring to FIG. 4, a math model (410) that includes color science language is created from the recipe (405). Math model 410 executes in a number of ways. For example, a three-dimensional look-up table, 3D LUT, (415) performs calculations and transforms upon the image. This process speeds up the transformation since only the points in 3D LUT 415 need to be calculated through the complete math model 410. The image is processed through 3D LUT 415 by either a software interpolation algorithm or an interpolation algorithm used as hardware code 430. One example of hardware code 430 is FPGA code, which is an algorithm used to interpolate a 3D LUT in hardware. The 3D LUT is created from the color science, found in math model 410. The implementation processing is not limited to using 3D LUT 415; each pixel can be processed either in script processing software (420) or wired in hardware code (425) for enhanced processing speed. The script processing software 420 enables platform independent processing.

Referring again to FIG. 2, the processing engine (260) generates images that incorporate the desired look and also transforms the image into the proper digital code values for displaying on properly calibrated display devices (265). Output device manager (240) communicates an image transform to the script generator 235, which transmits metadata about the display device 265 such that the script generated will faithfully render the image on the display device 265. Alternatively, a digital film recorder (not shown in F*ig*.2) writes the data, without the display transform, to film for subsequent printing and display. LMS simulation engine (220) generates recipe 225. LMS simulation engine (220) takes as input the user choices from GUI (230) and data from LMS data reader (215) to produce a recipe 225 that associates the user's choices with LMS color science data (210) generated by LMS data creator (205).

The total of the possible inputs and outputs for any subsystem and the method for moving image data through the processing chain is the Look Management System. The software that takes the users input and interprets that input into a recipe and then a mathematical model of the desired image chain is the look management engine.

Figure 3:
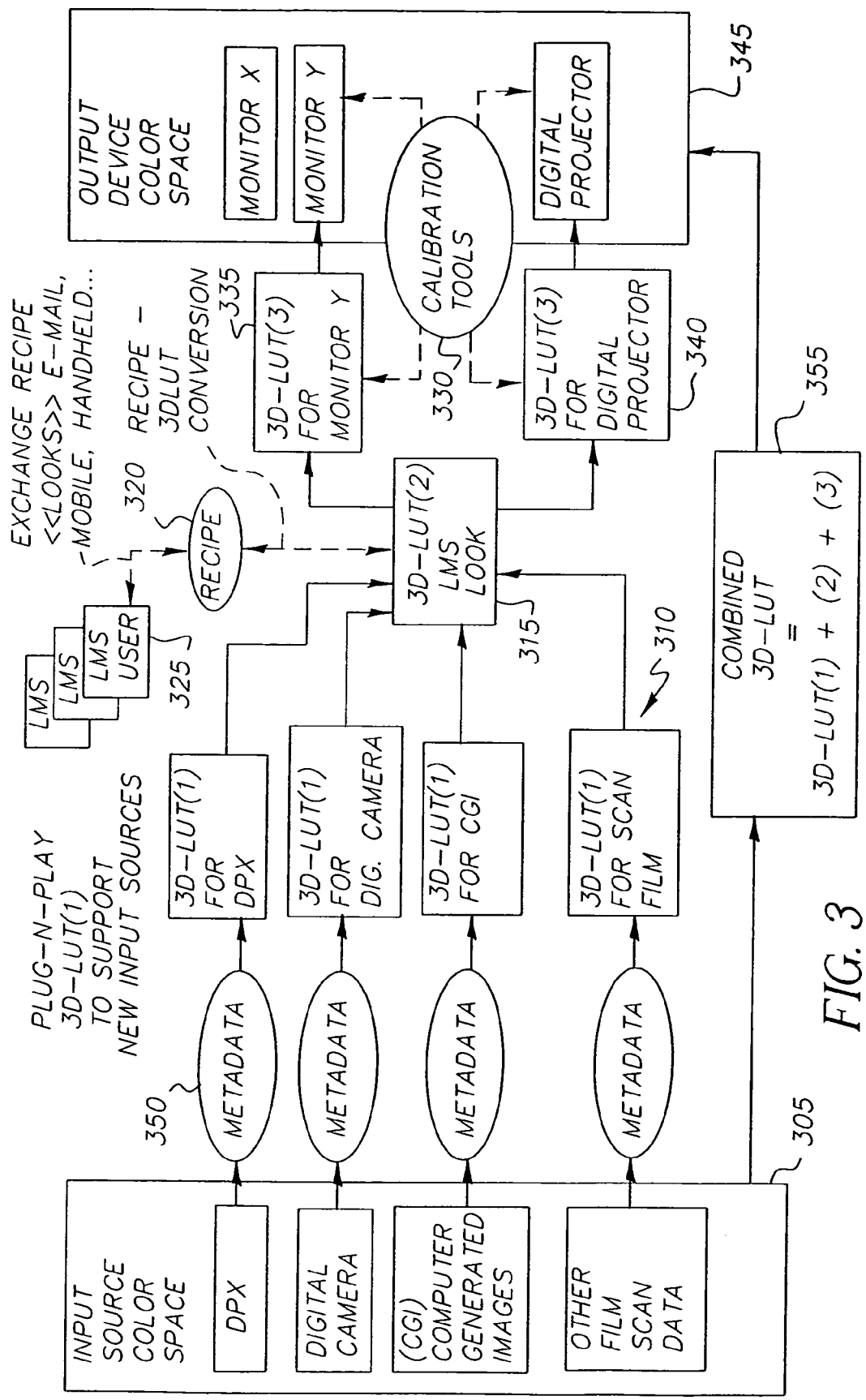
FIG. 3 is a flow of 3D LUTs possible through the look management system.

Referring to FIG. 3, there are several possible 3D LUTs in the processing pathway. In FIG. 3, an example of one possible scenario is shown. Multiple input source color spaces (305), including DPX files 301, digital still camera 302, computer generated images (CGI) 303, and other scanned film data 304 are associated with their corresponding metadata (350), which enables selection of a proper 3D LUT(1)(310) to process the image. Several 3D LUTs(1) correspond to the input source color spaces 305, including 3D LUT(1) for DPX 311, 3D LUT(1) for digital still camera 312, 3D LUT(1) for CGI 313, and 3D LUT(1) for scanned film 314.

A LMS user (325) generates a recipe (320) which is used to create a "look" 3D LUT(2) (315) in the script generator (235) and processing engine (260), discussed earlier and shown in FIG. 2. A display device (345) is chosen and with the use of display calibration tools (330), a display device 3D LUT(3) (335 and/or 340) is created. 3D LUT(3) 335 corresponds to display device's color space exhibited by a monitor. 3D LUT (3) 340 corresponds to display device's color space exhibited by a digital projector. The total rendering of the images from the various input source color spaces (305) can be done in one 3D LUT by combining an input source 3D LUT(1) with a "look" 3D LUT(2) and a display device 3D LUT(3). Such a combined 3D LUT (350) should preferably be done in proper sequential order to maintain the accuracy of the math model 410, shown in FIG. 4.

Figure 5:
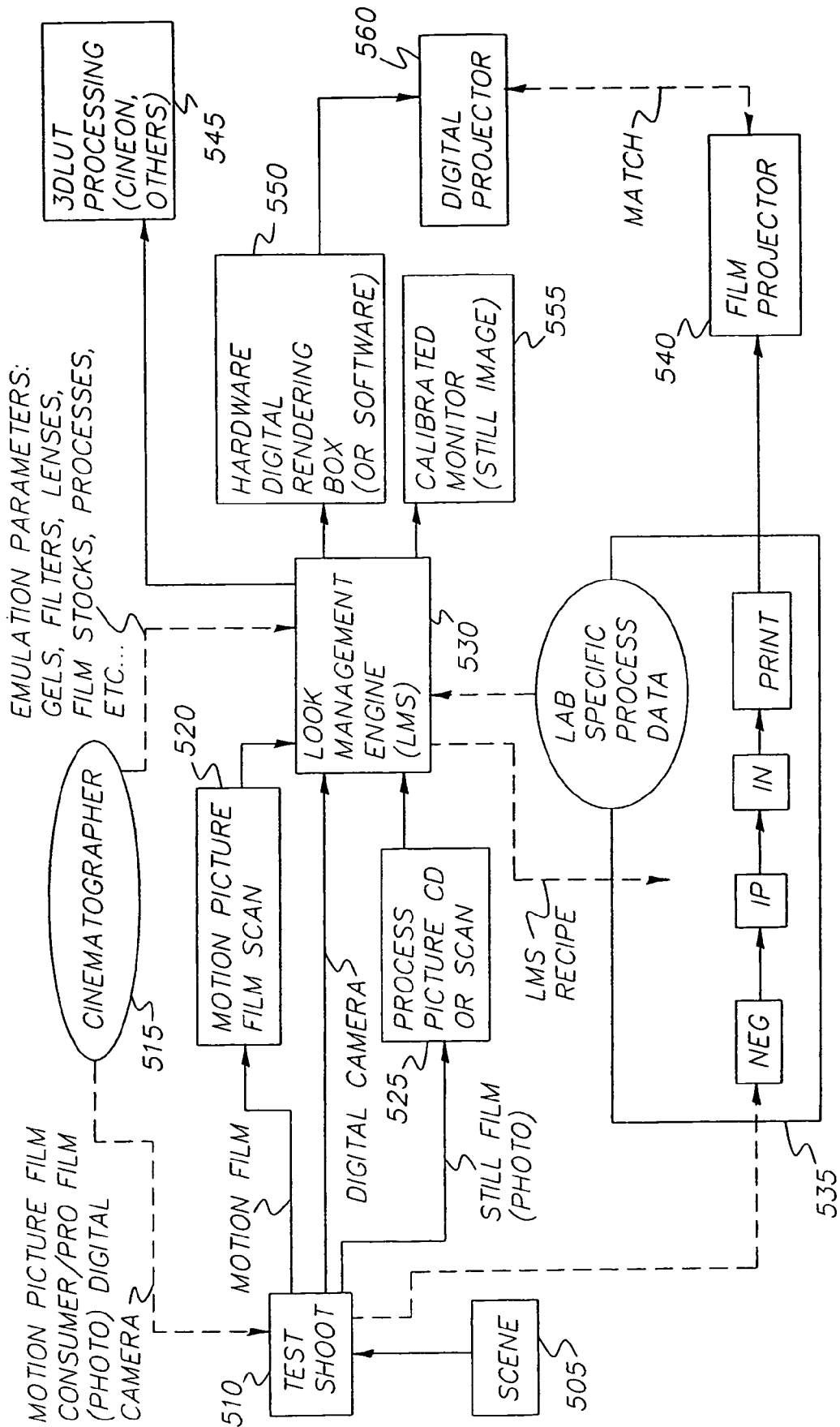
FIG. 5 is a diagram of one use of the look management system in pre-production and production.

The LME 100 can be used at different phases of the production cycle. First, in the pre-production subsystem, the LMS can communicate the creative intent even before the project filming begins. Referring to FIG. 5, a block diagram shows one embodiment of the use of LME 100 in pre-production. A scene (505) is captured on a photographic medium or device (510) by a cinematographer, director of production or other creator/originator. If the medium is film, a standard calibrated scan or preferably a "one light scan" (520) (a scan where the scanner is specifically set up in a calibrated mode to capture the largest range of film density that the characteristics of the scanner allow) is input to LME (530). Alternatively, a still image from digital camera or scanned film can be used as an input source 525. The user can produce many different scenarios of the film chain (535) and display them on a display device (555 and/or 560). Different scenarios can be choices of film types, exposure conditions, use of filters and process changes and other user inputs that alter the look of the image. Exposure conditions can be shutter or aperture control to alter the exposure to the film or digital camera, also light altering entities such as camera filters and lighting gels. Iteratively, the user can narrow down the choices until he is satisfied with the image's look. This look can then be distributed to the major principles in the project to communicate the creative intent of the upcoming production.

In a production subsystem, where film is shot on a day-to-day basis, the same scenario, as shown in FIG. 5 pre-production exists. However, some of the film from the daily production shoot can be scanned and input into the LME 530 to monitor and communicate to the production team. A recipe 532 or a rendered image can also be transmitted to a colorist at a film laboratory or to a telecine colorist in a digital post-production house for a reference while producing a daily image set. In production, where a daily image sequence is output not to a film print, but to a video medium (such as, tape or DVD, etc.) the present invention enables the creative "look" to be put into the first images coming back from the telecine scans, by rendering the images through a "look" 3D LUT with the corresponding display device 3D LUT. Consequently, with the present invention one can easily add the creative "look" using a 3D LUT (or a pixel-by-pixel software calculation), and deliver daily images with the desired look added.

Figures 6, 6A:
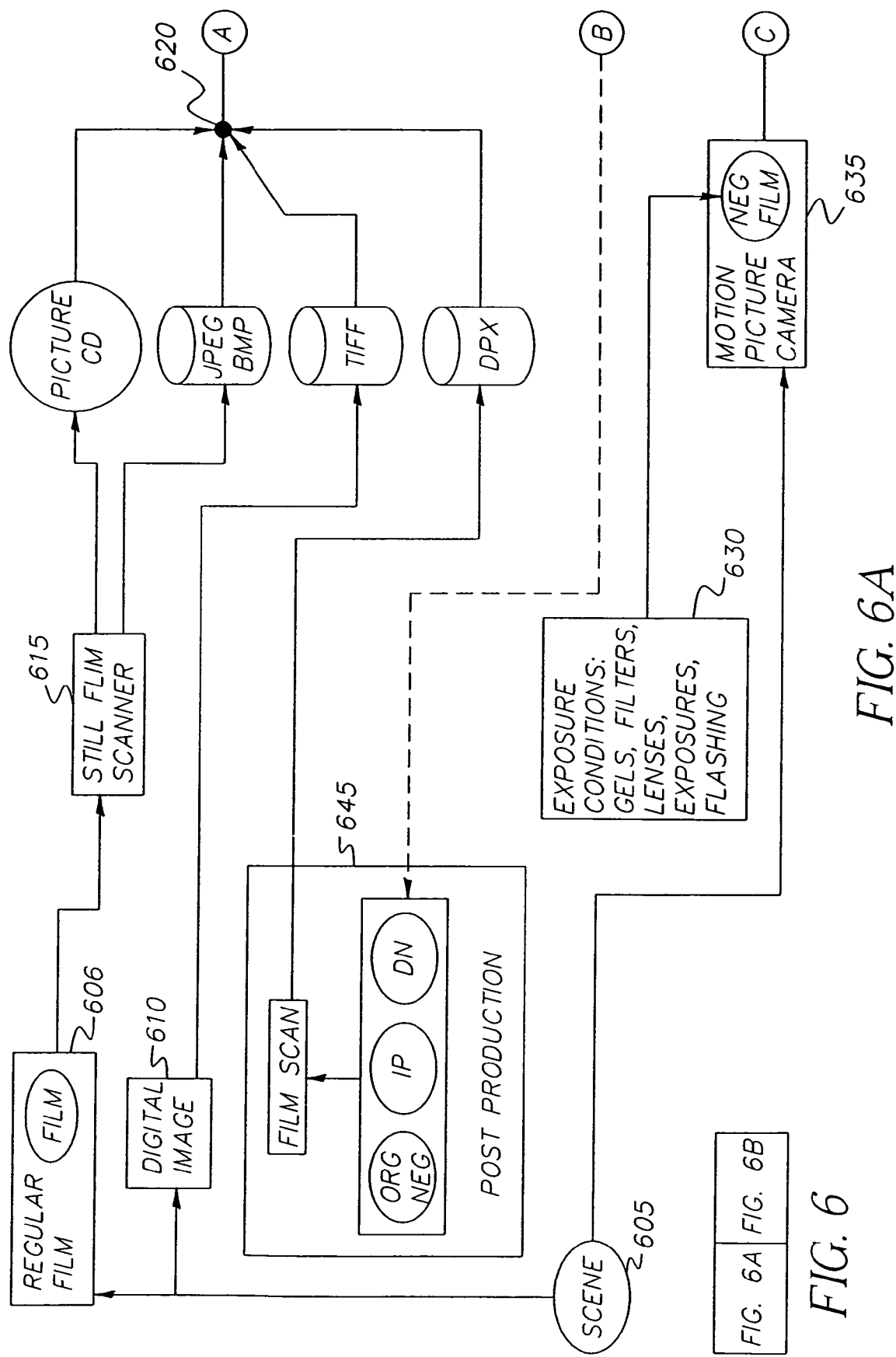
FIG. 6 is a flow diagram of one way the look management system can be used as a subsystem in the laboratory post-production chain.
Figure 6B:
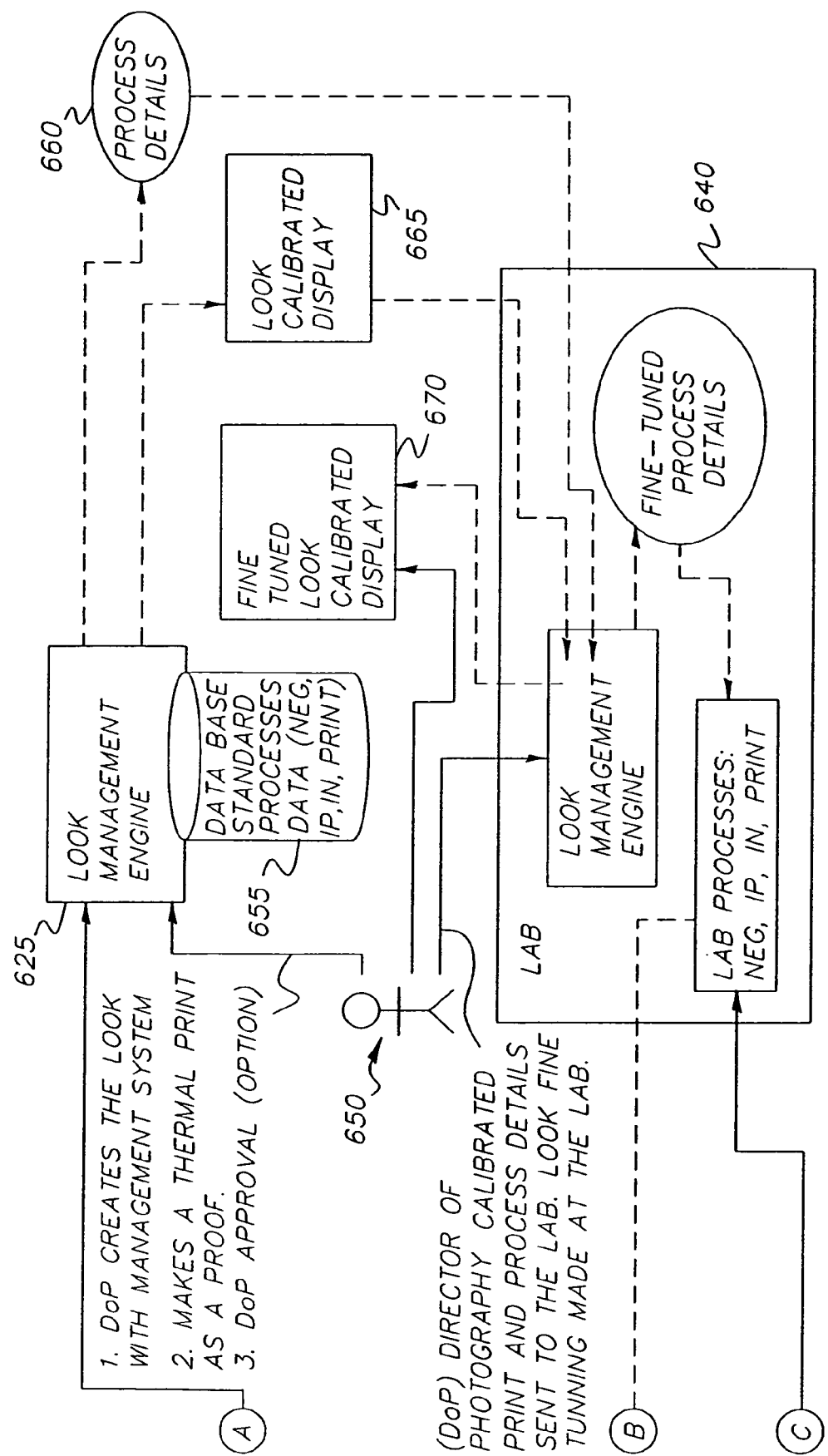

Referring to FIG. 6, a film laboratory post-production subsystem is shown as alternative embodiment. LME 625 is intended for projects that only use film products in the imaging chain (as opposed to a hybrid of film and digital post-production or digital only post-production). LME 625 can show a cinematographer (or other creative) what look can be expected from the film exposure and processing choices selected. In this manner, the initial testing time is greatly decreased since many of the scenarios can be emulated in software to arrive at a "look." Communication with the laboratory can be with printed images rendered with a recipe or electronic images rendered with a recipe. In FIG. 6, a scene (605) is photographed on film (as either a still image (606) or motion film image (635)) and processed in the laboratory. Alternatively, a digital image (610) from a digital camera 603 can be used. The scan from a still film scanner (615) is input (620) into the LME (625). The motion film images (635), exposed with their criteria (630), are processed at laboratory (640) and scanned (645) to generate an industry standard file.

A cinematographer (650) oversees the creative "look" by initially creating the "look," then sharing this "look" with the laboratory 640. The sharing can occur via a thermal print, ink jet print or an electronic display. Collaborative issues such as film choice (655), processing conditions (660), printing conditions, exposure and filter conditions (630) and selected display type (665,670) are communicated to persons or automated devices in the laboratory 640.

Figures 7, 7A:
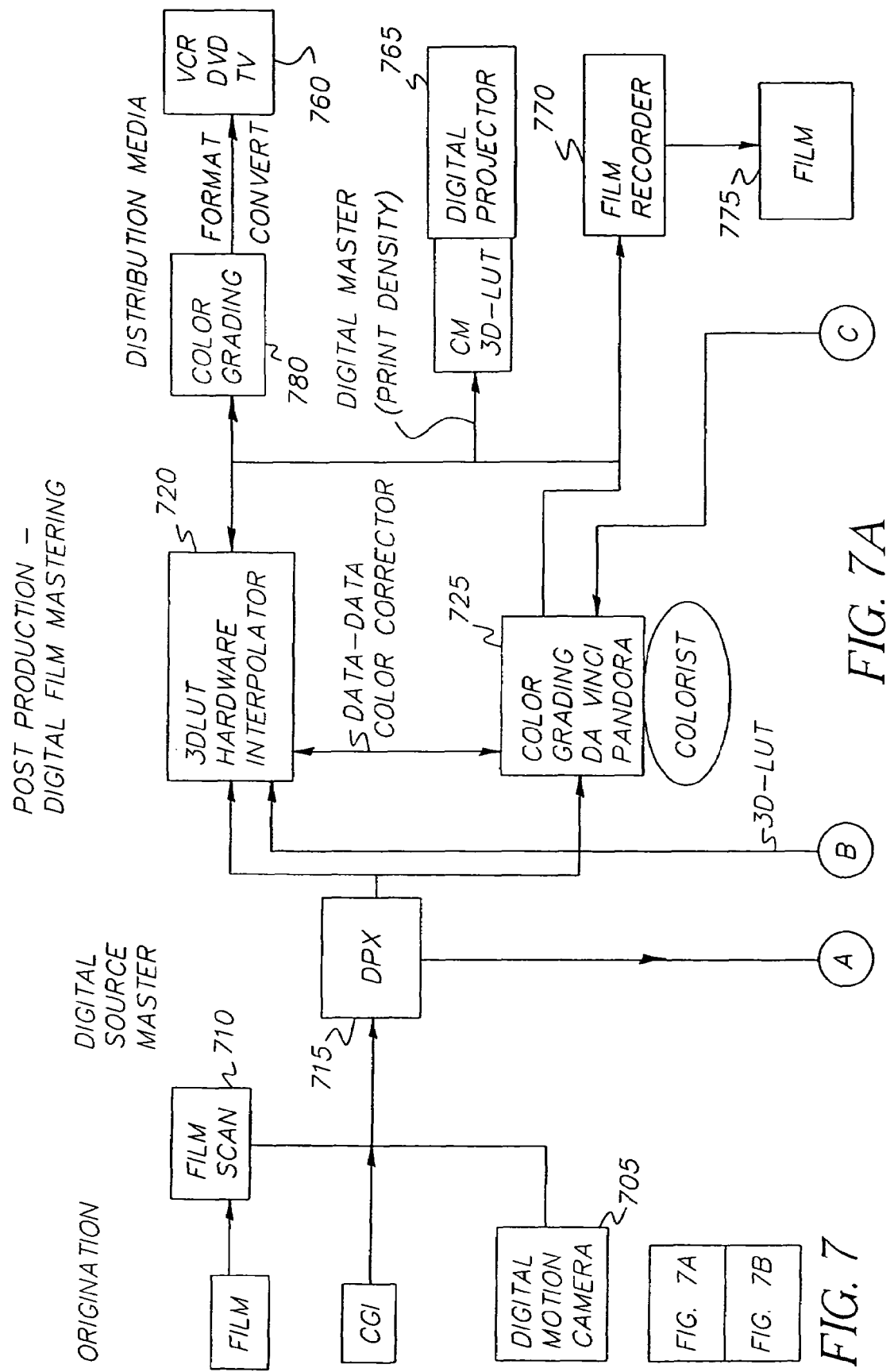
FIG. 7 is a flow diagram of one way the look management system can be used as a subsystem in the digital post-production house.
Figure 7B:
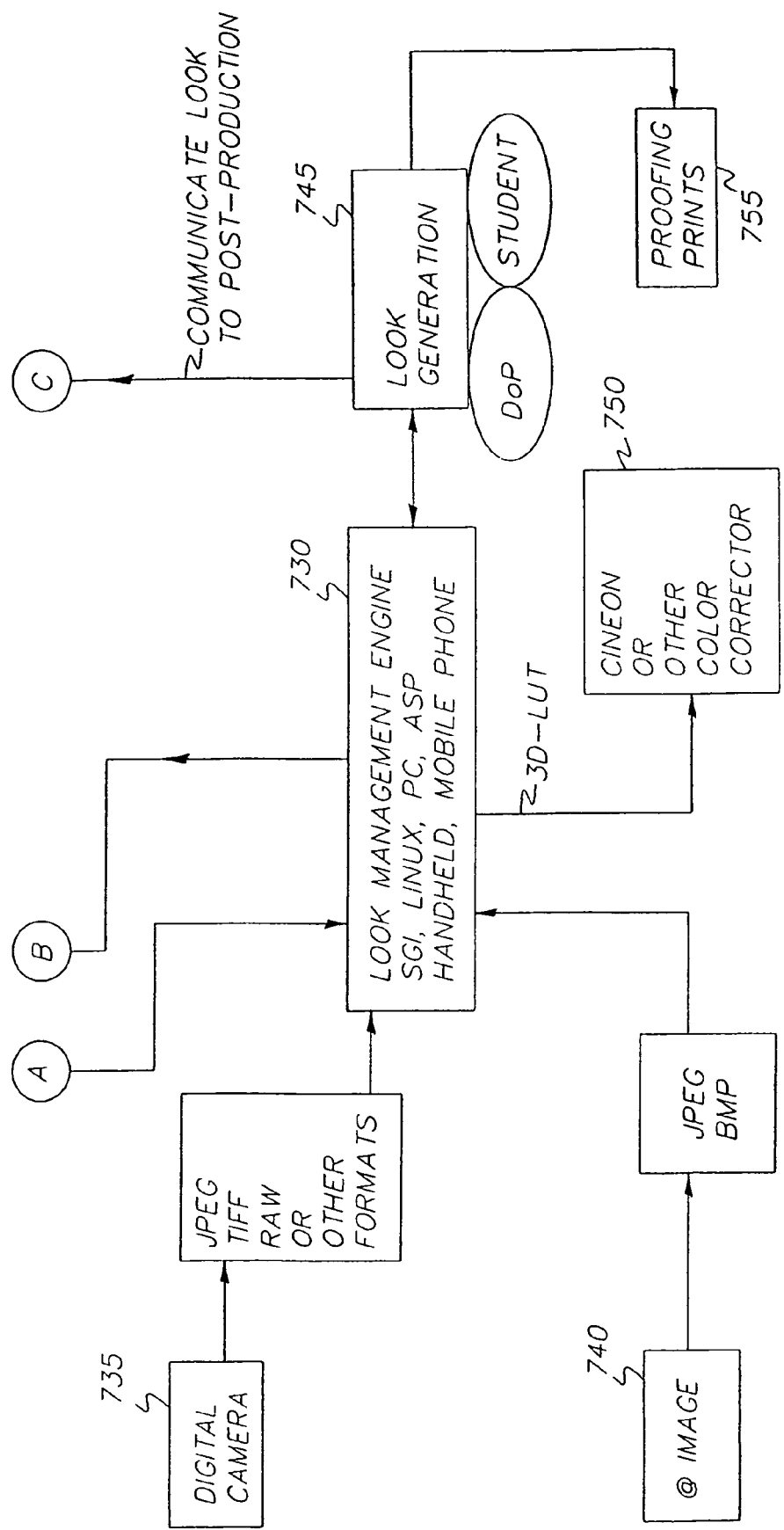

Referring to an illustrative digital post-production subsystem shown in FIG. 7, the present invention will have some degree of digital image rendering in the imaging chain. As in previously discussed subsystems for the present invention, an initial image for input into a LME 730 can be images derived from scanned film, CGI files, digital still cameras or other images having the following formats: JPEG, BMP, TIFF etc. Once a film is scanned (710) and stored as an industry standard DPX file (or other current and future industry standard formats), it can be loaded into the LME (730), such that a creator/originator can generate a "look" for the image (745). A proofing print can be generated (755) to help visually communicate the "look." LME 730 creates a 3D LUT, which can be used to render the image stream in color correction software (750) or in hardware. The 3D LUT (or a recipe) can be transmitted to a data-to-data color grading system (725), such as DaVinci™ or Pandora™, which interpolates the data through the 3D LUT. The 3D LUT can be transmitted to an external (or internal) hardware interpolator (720) to render the image. The rendered image can be further fine-tuned in another color grading operation (780), or recorded to film (775) on a film recorder (770). In this manner, the original film scan can be left undisturbed on the path to the film recorder or other output digital formats (760), such as VCR, DVD etc. The main "look" is provided by the 3D LUT from the LME 730 and other color changes can be implemented through the data-to-data color correctors and other effects processors. These effects are stored as an edit decision list; this edit decision list, along with the 3D LUT, can completely render an original scan to the final output in a single pass without requiring storage of any intermediate data files.

Figure 8:
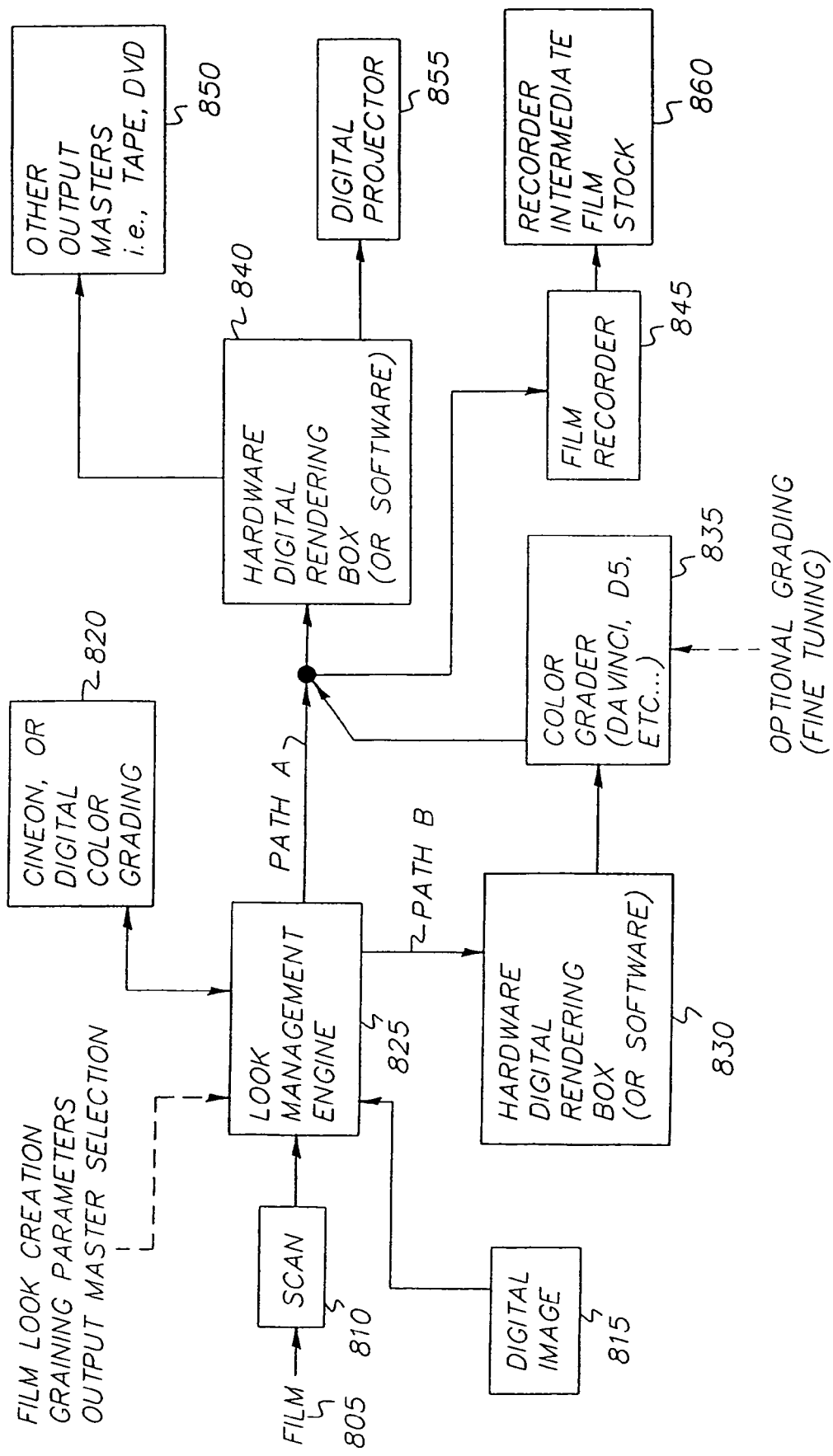
FIG. 8 is flow diagram of another way the look management system can be used as a subsystem in the digital post-production house.

A third alternative embodiment of a digital post-production subsystem is shown in FIG. 8. Film (805) is scanned via scanner 810 to produce digital files that contain the filmed image. Alternatively, an original digital image (815) can be used. In this embodiment for the present invention, there are at least two paths. In path A, a recipe or 3D LUT from LME (825) is passed to a hardware digital rendering box (840) (or software) which only has the "look" 3D LUT for rendering to film recorder output, or the "look" 3D LUT is combined with an output display 3D LUT which includes display device characteristics as well as characteristics of emulated print material color and tone scales. Utilizing path A, no further color correction is required to output a desired image with the "look" to film, or any digital display device.

Utilizing path B, an output of a hardware render box (830) is directed to a data-to-data color corrector (835). A 3D LUT in the hardware render box (830) only needs to be the "look" 3D LUT to impart the look before further color correction. After the data-to-data color grader (835), the image is rendered in a second hardware render box (840) which contains only the 3D LUT that takes the image data and renders it to a display device (850, 855) having associated display device characteristics as well as characteristics of emulated print material color and tone scales. In this embodiment, if the output is to the film recorder, the second hardware render box (840) can be skipped, or it could contain a second "look" 3D LUT for special looks.

The invention has been described with reference to a preferred embodiment. However, it will be appreciated that a person of ordinary skill in the art can effect variations and modifications without departing from the scope of the invention.

PARTS LIST 100 look management system
105 film
110 scanned film
115 digital still image
120 computer generated image (CGI)
125 originators/creators
130 look management engine
135 color correctors
140 digital projector
145 digital master
150 film output
205 LMS Data Creator
210 LMS Data
215 LMS Data Reader
220 LMS Simulation Engine
225 LMS Recipe
230 Graphical User Interface (GUI)
235 LMS Script Generator
240 Output device manager
245 LMS Script
250 Input Images and Metadata
255 Image source reader
260 LMS Processing Engine
265 Output Device (CRT, Digital Projector, Film recorder etc.)
305 Input Image source color space
310 3D-Lut(1) to support input image source type
315 3D-Lut(2) created from LMS "look"
320 LMS recipe
325 LMS user input choices
330 Display Device calibration tools
335 3D-Lut(3) for a specific calibrated monitor display device
340 3D-Lut(3) for a specific calibrated projector display device
345 Output Display Devices
350 Metadata for the Input Image source color space
355 Combined 3D LUT (3D LUT(1)+(2)+(3))
405 LMS recipe
410 Math Model from LMS recipe
415 3D-Lut implementation of LMS recipe
420 Math operations in script of LMS recipe
425 Math operations wire in hardware of LMS recipe
430 Hardware Code (i.e., FPGA code)
505 Original Scene
510 Test shoot (film or digital capture)
515 Cinematographer (or creative user)
520 Motion picture film scan
525 Still Picture film scan
530 Look Management Engine
535 User choices in the photographic image chain
540 Film Projector
545 3D-Lut to render data
550 Hardware digital rendering box
555 Calibrated monitor
560 Digital projector
605 Original Scene
606 Still film capture
610 Digital camera capture
615 Still film scanner
620 Image input to Look Management Engine
625 Look Management Engine
630 User specified film exposure conditions
635 Motion picture camera and film
640 Look Management System used in the Laboratory
645 Post Production film scan
650 Director of Photography (DoP) or creative user
655 LMS process database
660 Process details
665 "Look" on a calibrated display
670 Fine tuned "Look" on a calibrated display
705 Motion image origination images
710 Film scanner
715 Industry standard DPX file of image
720 3D LUT hardware interpolator
725 Industry standard color grading unit
730 Look management engine
735 Still digital camera input
740 Other still image input
745 User look generation (GUI choices)
750 Industry standard color corrector
755 Hardcopy proofing prints
760 Electronic distribution media
765 Digital Projector
770 Film recorder
775 Film output
780 Alternative color grading
805 Film input
810 Film scanner
815 Digital Image input
820 Industry standard color corrector
825 Look Management Engine
830 3D LUT hardware interpolator
835 Industry standard color grading unit
840 3D LUT hardware interpolator
845 Film recorder
850 Electronic distribution output masters
855 Digital Projector
860 Output film record

What is claimed is:

1. A method for communicating and preserving creative intent at different phases of a motion picture production cycle comprising the steps of:
   (a) providing an original scene image comprising one of a still image, a computer generated image and a sequence of images during either the pre-production stage or the production stage;
   (b) generating a look representative of a creative intent, wherein the look is a digital representation of a creative alteration of the captured original scene image;
   (c) sharing the look as an image by using a first display device including either a thermal print, an ink jet print, or an electronic display;
   (d) storing the digital representation of the look as a recipe including all of a user's creative choices altering the original scene image; and
   (e) communicating the recipe to a remote site for replication of the look on a second display device.

2. The method claimed in claim 1, wherein the step of generating the look representative of the creative intent is accomplished via a handheld computing device and/or a mobile phone, or a digital display device.

3. The method claimed in claim 1, wherein the look is displayed at the remote site on the second display device being one of a handheld computing device and/or a mobile phone or a digital display device.

4. The method claimed in claim 1, further comprising the step of:
   (g) storing output images with the look applied thereon as a digital master.

5. A system for communicating and preserving creative intent at different phases of a motion picture production cycle comprising:
   (a) means for providing an original scene image comprising one of a still image, a computer generated image or a sequence of images during a pre-production phase or a production phase;
   (b) means for generating a look representative of a creative intent, wherein the look is a digital representation of a creative alteration of the captured original scene image;
   (c) means for sharing the look as an image by using a first display device including either a thermal print, an ink jet print, or an electronic display;
   (d) a storage means for storing the digital representation of the look as a recipe including all of a user's creative choices altering the original scene image;
   (e) a communication means for providing the recipe to a remote site for replication of the look on a second display device; and
   (f) means for applying the recipe to image data at the remote site according to metadata about the second display device to transform a look of the image data displayed on the second display device to correspond to the look of the image on the first display device.

6. The system claimed in claim 5, wherein the means for generating the look representative of the creative intent is accomplished via either a handheld computing device and/or a mobile phone, or a digital display device.

7. A system for communicating and preserving creative intent within a motion picture production chain including a production stage during which the motion picture is shot and at least one of a subsequent laboratory or post production stage during which the motion picture is processed, said method comprising the steps of:
   (a) means for providing an original scene image comprising one of a still image, a computer generated image and a sequence of images during either the pre-production stage or the production stage;
   (b) means for generating a look representative of a creative intent, wherein the look is a digital representation of a creative alteration of the captured original scene image;
   (c) means for sharing the look as an image by using a first display device including either a thermal print, an ink jet print, or an electronic display; and
   (d) means for storing the digital representation of the look as a recipe including all of a user's creative choices altering the original scene image;
   (e) a communication means for providing the recipe to a remote site for replication of the look on a second display device; and
   (f) means for rendering the recipe to telecine scanned image data at the remote site for production of a daily image set having a look directly corresponding to the look of the original scene image on the first display device.

8. The system claimed in claim 7, wherein the recipe includes additional data selected from the group consisting of scripting software, edit decision lists, security codes, metadata corresponding to a display device, image metadata, gaining parameters, human readable information, tracking information, recipe sharing authorization, calibration information, and emulation parameters.

* * * * *

UNITED STATES PATENT AND TRADEMARK OFFICE
CERTIFICATE OF CORRECTION

PATENT NO.         : 7,583,355 B2
APPLICATION NO.    : 11/143168
DATED              : September 1, 2009
INVENTOR(S)        : Mitchell J. Bogdanowicz et al.

Page 1 of 1

It is certified that error appears in the above-identified patent and that said Letters Patent is hereby corrected as shown below:

Col. 12, line 29-30    In Claim 8, delete "gaining" and insert -- graining --, therefor.

Signed and Sealed this

Twenty-seventh Day of October, 2009

David J. Kappos
*Director of the United States Patent and Trademark Office*